Patented Aug. 8, 1939

2,168,375

UNITED STATES PATENT OFFICE 2,168,375

CHITIN XANTHATE

Clifford J. B. Thor, Chicago, Ill., assignor to The Visking Corporation, Chicago, Ill., a corporation of Virginia No Drawing. Original application July 9, 1936, Serial No. 89,768. Divided and this application September 9, 1937, Serial No. 163,037

20 Claims. (Cl. 260—210)

This application is a division of my copending application Serial No. 89,768, filed July 9, 1936.

This invention relates to new chemical compounds and method of producing the same. More particularly, this invention relates to chitin compounds or derivatives and methods of producing the same. Specifically, this invention relates to chitin xanthate and compositions containing the same as well as methods of producing said chitin xanthate and compositions.

Chitin is generally considered to be composed of polymerized or condensed mono acetyl hexosamine units. It has widespread occurrence in nature as a structural material chiefly in arthropod exo-skeletons and in the cell walls of numerous fungi. It is also available in large quantities from the refuse of crustacean fisheries, which at present is of little use other than as fertilizer and also to a limited extent as a high protein feed stock. Chitin can be easily removed from materials containing it and purified. The common and well-known procedures for obtaining chitin from, for example, crustacean refuse consist generally in converting the insoluble calcium salts into soluble calcium salts, removing the soluble calcium salts, treating the thoroughly washed residue with an alkali, preferably at an elevated temperature, to convert the adhering protein and other organic materials into a state capable of removal by filtration, and filtering. The residue is thoroughly washed with water and dried. According to this procedure, the residue is a light pink or almost white flaked preparation of relatively pure chitin. If desired, the chitin may be bleached. Though the obtaining and purifying of chitin is relatively cheap, and even though chitin has some very valuable characteristics, such as being relatively chemically inert, nevertheless, chitin has up to the present time no extensive commercial use in the arts and industry.

I have found that I can produce various new chemical compounds of chitin which have many uses in the arts and industries. For example, I have found that I can produce alkali chitin in which the equivalents of alkali metal (Na or K) bound per acetyl hexosamine unit may greatly vary, depending on the conditions of the treatment. This alkali metal chitin, I have found, can be used in the preparation of still other chitin compounds. It can be used, for example, in synthetic reactions of the heterogeneous type, such as xanthation, etherification by means of alkylene oxides or active halogen compounds, and other reactions which alkali metal alcoholates undergo.

I have also found that I can, as previously mentioned, xanthate the alkali metal chitin, thus producing a new chemical compound, i. e., chitin xanthate. I have further found that I can regenerate chitin from chitin xanthate. Thus, by extruding the chitin compositions through nozzles or orifices of the desired shapes and sizes into a suitable coagulating and regenerating bath, I can produce regenerated chitin articles, such as filaments, threads, films, ribbons, tubes, straws, etc.

It is, therefore, an object of this invention to provide new chemical compounds of chitin and methods of preparing the same.

Another object of this invention is to provide a new chitin compounds, i. e., chitin xanthate, and method of producing the same.

Other objects of this invention will become apparent from the following description and appended claims.

To produce, according to my invention, chitin xanthate, alkali metal chitin prepared in any suitable manner, as, for example, by the procedure set forth in application Serial No. 89,768, and preferably after shredding and preferably also without aging is xanthated. The xanthation may be carried out under such conditions as to produce a chitin xanthate or viscous dispersion of chitin xanthate having the desired water, chitin and alkali contents. Alternatively, the xanthation may be carried out under conditions producing chitin xanthate which subsequently may be formed into a viscous dispersion of the desired concentrations.

The chitin xanthate of this invention may be used for various purposes. For example, it may be used in the production of articles formed of regenerated chitin.

To produce an article of regenerated chitin the viscous dispersion of chitin xanthate, after deaeration and filtration to remove foreign substances, is extruded through any desired nozzle or orifice into a suitable coagulating and regenerating bath. After regeneration, the regenerated chitin article, while in the gel state, is treated in order to remove deleterious or undesirable compounds produced during the process. If desired, the article may also be bleached. In the case of films, threads, etc. the products may be treated with a conditioning agent prior to drying, and then thereafter dried in the usual manner. As to the details of the process of making articles formed of regenerated chitin and the articles per se, I refer to my copending application Serial No. 163,038.

Since alkali metal chitin is a new product, there is hereafter set forth a description thereof as well as several illustrative procedures of making the same. As to further details regarding alkali metal chitin, compositions containing the same and methods of producing the same, I refer to my copending application Serial No. 89,768, filed July 9, 1936.

In order to produce alkali metal chitin, I treat chitin with a caustic solution, preferably by steeping the chitin in a caustic solution. I have found that alkali metal chitin hydrolyzes so easily that for its formation it is highly preferable and advantageous to employ a steep caustic solution of high concentration and relatively low free water content. By "free water content" I means water which is present simply as a free solvent. For example, in a 40% to 50% caustic soda solution, although the water content is high, it is known that at ordinary temperature conditions a large proportion of this water is combined with the sodium hydroxide as water of hydration rather than being present simply as a free solvent.

In the course of my research, I found that chitin treated or steeped with aqueous caustic alkali solutions combines with increasing amounts of alkali, depending on the concentration of the steeping caustic solution. The following table shows that the quantity of alkali combining with chitin at room temperature (25° C.) increases as the concentration of the steep caustic increases:

| Percent NaOH in steep caustic | Equivalent of Na bound per acetyl hexosamine unit |
| --- | --- |
| 28.1 | .15 |
| 30.1 | .17 |
| 31.2 | .23 |
| 32.1 | .29 |
| 33.0 | .41 |
| 34.0 | .53 |
| 34.9 | .67 |
| 35.9 | .71 |
| 36.9 | .75 |
| 37.8 | .77 |
| 38.9 | .79 |
| 39.8 | .81 |
| 41.0 | .86 |
| 41.9 | .84 |
| 42.8 | .88 |
| 43.9 | .85 |
| 45.2 | .86 |
| 46.0 | .85 |
| 47.1 | .90 |
| 48.0 | .91 |
| 48.9 | .92 |
| 50.0 | .90 |

While alkali metal chitin would undoubtedly form in caustic steeping liquors of concentrations higher than 50%, it is believed that this would be impractical and inadvisable, due to excessive amounts of caustic soda necessarily held by the product in a mechanical way.

The extent of combination of chitin with alkali also depends on the temperature conditions. This is particularly the case when the lower concentrations of steep liquor are used. With the lower concentrations, the combination of chitin and alkali is increased if the operation is carried out at lower temperatures. Thus, for example, the extent of combination of alkali with the chitin is 0.48 and 0.56 equivalents per acetyl hexosamine unit when the steeping is carried out at 2° C. to 5° C. and the steep caustic concentrations are 30.3 and 32.3 respectively.

In any concentration of steep caustic in which the formation of alkali metal chitin occurs, the minimum temperature which may be used is the temperature at which the particular concentration of caustic used in the process would crystallize or solidify. The maximum temperature which may be employed in the process likewise varies with the concentration of the steep caustic used and is generally limited by the amount of combined alkali which may be desired in the alkali metal chitin for any specific purpose. Generally, it is desirable and preferable to work at somewhat below the maximum permissible temperature in any case, since the lower temperatures are not only conducive to increased combination of alkali but also would tend to minimize the possibility of partial deacetylation of the metal chitin by the alkali. No advantage is to be gained by working above ordinary room or plant temperatures, while reductions in temperature, in so far as practical, would always be an advantage from the chemical standpoint. If, for example, an alkali chitin containing 0.75 or more equivalents of combined Na per acetyl hexosamine unit is desired, the maximum temperature is somewhat above 25° C. when the caustic concentration range of the steep liquor is 40% to 50%, and approximately 25° C. when the caustic concentration range is 37% to 39%, and progressively below 25° C. as the caustic concentration drops from 37% to 30%. Thus, soda or alkali metal chitin containing 0.75 or more equivalents of combined Na per acetyl hexosamine unit may be prepared by steeping purified chitin for a suitable period of time in 38% to 50% aqueous caustic steep liquor at ordinary room temperature or in somewhat more dilute caustic steep liquor if the temperature of the operation is proportionally lowered.

After the chitin has been treated or steeped with the caustic steep liquor of appropriate concentration and under the selected temperature conditions for the required period of time, the excess caustic steep liquor is removed in any convenient manner, such as by pressing. The pressing may be carried out to remove as much steep liquor as desired. Usually, the pressing is such as to give an alkali metal chitin weighing approximately three times as much as the chitin originally used.

Though the alkali metal chitin has been previously described as being prepared with caustic soda steep liquors, it is to be understood that other caustic alkali steep liquors may be used. Potassium hydroxide is illustrative of another caustic alkali which may be employed to produce alkali metal chitin. When potassium hydroxide is employed, the conditions previously mentioned in connection with the use of caustic alkali may be used.

Alkali metal chitin may be dispersed in an aqueous medium. In order to disperse alkali chitin in an aqueous medium, the operation should preferably be carried out at a temperature in the neighborhood of 0° C. or lower. One illustrative procedure for dispersing alkali chitin in water is to mix the alkali metal chitin with the desired quantity of crushed ice which, in contact with the caustic soda in the alkali chitin, provides a freezing mixture. It is obvious that the final alkali metal chitin content of the dispersion may be varied within wide limits. Generally, the alkali metal chitin content depends on the use to which the final dispersion is to be put. It has been found that, when the dispersions of alkali metal chitin are to be used for xanthation, combination with active halogen compounds, etc., it is preferable that the alkali chitin content in the dispersion be of the order of 6% to 7%.

In order to more clearly explain the production of alkali metal chitin, there are hereafter set forth several illustrative specific examples of producing alkali chitin.

*Example 1*

300 grams of chitin flakes, such as are prepared from "shrimp bran", are steeped in 6 liters of 35% NaOH at 0° C. for 2 hours. Excess caustic solution is then removed by pressing. The resulting alkali metal chitin is kept cold until desired for further use. It will contain approximately .70 equivalents of combined Na per acetyl hexosamine unit.

*Example 2*

300 grams of chitin flakes are steeped in 6 liters or more of 40% NaOH at room temperature (25° C.) or lower for 2 hours. The excess caustic may be removed by pressing in any convenient manner to give an alkali metal chitin weighing slightly less than 3 times as much as the original chitin. This product contains approximately .80 equivalents of combined Na per acetyl hexosamine unit.

*Example 3*

300 grams of chitin are steeped in 6 liters of 50% NaOH for 2 hours at room temperature, with occasional or continuous stirring. Excess caustic solution is removed by pressing until the weight of the alkali metal chitin is approximately 3 times the weight of the chitin used. It will contain approximately .90 equivalents of combined Na per acetyl hexosamine unit.

*Example 4*

An unaged press cake of alkali chitin, as produced in Examples 1, 2 or 3, is shredded and mixed in a suitable device with 3 to 3.5 kgs. of crushed ice for ½ hour, whereby an aqueous dispersion of alkali metal chitin is produced. It may be kept in a suitable container, preferably at near 0° C., until used.

As previously explained, to produce chitin xanthate alkali chitin is treated with carbon bisulphide. The xanthation of chitin may be carried out in several ways.

According to one procedure, a cold dispersion of alkali chitin prepared as hereinbefore described and having the desired chitin and alkali contents, such as, for example, 6% to 8% of chitin, is mixed at a temperature of from −10° C. to +15° C. in a suitably jacketed and cooled apparatus with such quantity of carbon bisulphide and for such a time until the desired degree of xanthation is secured. Generally, the amount of carbon bisulphide employed will be between one-quarter and one-half the weight of the original chitin, and the time from approximately 2 to 10 hours. The resulting dispersion of chitin xanthate is considerably more stable than that of the alkali metal chitin itself, especially at room temperature.

Another procedure for producing dispersions of chitin xanthate contemplates agitating relatively dry alkali metal chitin, preferably unaged, in a closed container with a quantity of carbon bisulphide equal to one-quarter to one-half of the weight of the original chitin from 1 to 6 hours. This procedure usually results in a partial xanthation of the chitin which, however, aids in the dispersion process. Thereafter, without removal of any excess carbon bisulphide, the dispersion of the partially xanthated alkali metal chitin is secured by adding the desired amount of water under conditions which maintain a temperature between −10° C. and +15° C. throughout the mixture. This can be done by adding all of the water in the form of crushed ice and thoroughly mixing the same with the partially xanthated chitin. The resulting dispersion may then be further mixed with external cooling, while the xanthation process goes to completion or it may be allowed to stand in a closed vessel in a cold room at about 0° C. for several hours. After this stage, a final thorough mixing is advantageous.

The caustic soda (NaOH) content of the dispersion can be controlled within limits by the concentration of the steep caustic used in the production of the alkali metal chitin, by the efficiency of the removal of the excess steep caustic by the addition of weak organic acids, such as acetic acid, to neutralize part of the caustic soda, thus reducing its concentration to a lower point, or, if desired, by the addition of caustic soda after the first xanthation treatment. The addition of caustic soda during the dispersion process is not necessary and usually undesirable, because the alkali chitin contains an adequate amount. For example, if the chitin is steeped in 38% NaOH and the alkali metal chitin pressed to 3 times the weight of the original chitin and the quantity of ice used is such as to give a chitin content of 7% in the final dispersion, the sodium hydroxide content will be approximately 6%. Under exactly similar conditions using 50% steep caustic, the NaOH content will be approximately 8% when the chitin content is 7%. These figures represent practically the lower limits of NaOH concentration attainable in a final dispersion of chitin xanthate containing 7% of chitin at the two extremes of steep caustic concentration, between which room temperatures steeping is successful. Obviously, if the efficiency of the pressing of the alkali metal chitin is less than indicated, the alkali content of the final dispersion necessarily will be greater than these minimum values.

The chitin xanthate dispersion is best stored at somewhat below room temperature. Prolonged storage at room temperature results in some deacetylation of the chitin which may be detrimental to the quality of films, threads, etc. produced from it. Storage, however, does not result in gelling or precipitation of the chitin, except after more extending periods of time. The extent of deacetylation of the chitin under such conditions varies with the alkali content of the final dispersion. If the dispersion of chitin xanthate is to be used in the production of regenerated chitin articles, such as films, threads, filaments, etc., the dispersion is filtered and deaerated after the production of the same and prior to extrusion thereof.

Hereafter are set forth several illustrative examples of procedures for producing chitin xanthate dispersions:

*Example 5*

300 grams of purified chitin secured in any manner are steeped in 6 liters of 50% NaOH at room temperature (25° C.) for 2 hours. Sufficient excess caustic is removed by pressing to give a press cake weighing approximately 900 grams. The press cake of alkali metal chitin is shredded and the unaged shredded alkali chitin is mixed with 3 to 3.5 kgs. of crushed ice and 100 cc. of carbon bisulphide. Mixing is continued in a closed mixer at a temperature of not over 10° C. for several hours until the free carbon bisulphide has disappeared.

The resulting viscous dispersion of chitin xanthate, which has a caustic alkali content (NaOH) of 7.5% to 8.4% and a chitin content of 6.6% to 7.4%, is filtered and deaerated.

Example 6

150 grams of purified chitin obtained in any manner are steeped in 3 liters of 40% NaOH at room temperature (25° C.) or lower for 2 hours. Sufficient excess caustic is removed by pressing to give a press cake weighing about 450 grams. The press cake is shredded and then shaken in a closed vessel with 60 cc. of carbon bisulphide for 4 hours at 25° C., after which the mixture is transferred to a 1 gallon thermos jug and mixed with 1600 grams of crushed ice. Mixing is continued for 1 hour, then the jug is closed and allowed to stand for 12 to 16 hours. After this period the dispersion is mixed thoroughly, filtered and deaerated. This dispersion has a caustic alkali content (NaOH) of 6.5% and a chitin content of 7.0%.

Example 7

300 grams of purified chitin obtained in any manner are steeped in 6 liters of 50% NaOH at room temperature (25° C.) for 2 hours, after which excess caustic is removed by pressing to give a press cake weighing about 960 grams. The unaged alkali metal chitin, preferably after shredding, is shaken in a closed container with 120 cc. of carbon bisulphide for 5 hours at 25° C. The partially xanthated mixture, still containing free carbon bisulphide, is mixed in a power mixer with 3,175 grams of crushed ice for ½ hour and then transferred to a container which is closed and kept at near 0° C. for 12 to 16 hours. The dispersion is again mixed in the mixer for 1 hour, then filtered and deaerated in vacuo. A viscous dispersion of chitin xanthate containing about 7% chitin and 8.5% caustic alkali content (NaOH) is obtained.

When the chitin xanthate composition is to be used in the manufacture of articles of regenerated chitin, as more fully described in my copending application Serial No. 163,038, it is preferred that the said composition contain 5% or 6% to 8% of chitin and 5% to 9% of alkalinity calculated as caustic soda (NaOH), and specifically 7% chitin, and 7% and preferably 6% alkalinity calculated as caustic soda (NaOH).

Since it is obvious that various changes and modifications may be made in the above description without departing from the nature or spirit thereof, this invention is not restricted thereto except as set forth in the appended claims.

I claim:
1. Chitin xanthate.
2. A dispersion of chitin xanthate.
3. A dispersion of chitin xanthate having an alkaline content calculated as NaOH of from 5% to 9% and 5% to 8% of chitin.
4. An aqueous dispersion of chitin xanthate having an alkaline content calculated as NaOH of approximately 6% to 7% and a chitin content of approximately 7%.
5. An aqueous dispersion of chitin xanthate having an alkaline content calculated as NaOH of approximately 8.5% and a chitin content of approximately 7.0%.
6. An aqueous dispersion of chitin xanthate having an alkaline content calculated as NaOH of approximately 7.5% to 8.4% and a chitin content of approximately 6.6% to 7.4%.
7. A process of preparing chitin xanthate which comprises treating chitin with an alkali and carbon bisulphide.
8. A process of preparing chitin xanthate which comprises producing a dispersion of alkali metal chitin, and causing it to react with carbon bisulphide.
9. A process of preparing chitin xanthate which comprises producing a dispersion of alkali metal chitin, and causing it to react with carbon bisulphide for approximately 2 to 10 hours, the quantity of carbon bisulphide being equal to ¼ to ½ the original chitin content.
10. A process of preparing chitin xanthate which comprises producing alkali metal chitin, mixing said alkali metal chitin with carbon bisulphide and crushed ice in a closed container, and continuing the mixing until any free carbon bisulphide has disappeared.
11. A process of producing chitin xanthate which comprises producing alkali metal chitin, mixing the alkali metal chitin with carbon bisulphide in a closed container, thereafter adding crushed ice, and mixing.
12. A process of preparing chitin xanthate which comprises producing a dispersion of alkali metal chitin, and causing it to react with carbon bisulphide at a temperature of approximately −10° C. to +15° C.
13. A process of preparing chitin xanthate which comprises producing a dispersion of alkali metal chitin, and causing it to react with carbon bisulphide for approximately 2 to 10 hours at a temperature of approximately −10° C. to +15° C., the quantity of carbon bisulphide being equal to ¼ to ½ the original chitin content.
14. A process of producing chitin xanthate which comprises treating alkali metal chitin with carbon bisulphide until the chitin is partially xanthated at a temperature between −10° C. and +15° C., thereafter adding water under conditions which maintain a temperature of between −10° C. and +15° C. to the partially xanthated chitin, and permitting the reaction to go to completion.
15. A method of preparing chitin xanthate which comprises mixing unaged shredded alkali metal chitin with crushed ice and carbon bisulphide in a closed container at a temperature not over 10° C. until the free carbon bisulphide has disappeared.
16. A method of preparing chitin xanthate which comprises mixing shredded alkali metal chitin with carbon bisulphide for about 4 hours at a temperature around 25° C., mixing the mass with crushed ice, and then causing the reaction to go to completion.
17. A method of preparing chitin xanthate which comprises mixing unaged shredded alkali metal chitin with carbon bisulphide for about 5 hours at a temperature of around 25° C. to produce a partially xanthated mixture containing free carbon bisulphide, then mixing the mass with crushed ice, and causing the reaction to go to completion.
18. A method of preparing chitin xanthate which comprises mixing unaged alkali metal chitin with a quantity of carbon bisulphide equal to one-quarter to one-half of the weight of the original chitin for 1 to 6 hours, thereafter, without removing any excess carbon bisulphide, adding the desired quantity of water under condi- tions which maintain a temperature between −10° C. and +15° C. throughout the mixture, and permitting the reaction to go to completion.

19. A method of producing chitin xanthate which comprises treating 300 grams of chitin to produce a press cake of alkali metal chitin weighing approximately 900 grams, shredding said press cake, mixing the unaged shredded alkali metal chitin with 3 to 3.5 kgs. of crushed ice and 100 cc. of carbon bisulphide, continuing the mixing in a closed container at a temperature of not over 10° C. until the free carbon bisulphide has disappeared.

20. A method of producing chitin xanthate which comprises treating 300 grams of chitin to produce a press cake of alkali metal chitin weighing approximately 900 to 960 grams, shredding said press cake, mixing the unaged shredded alkali metal chitin with appriximately 120 cc. of carbon bisulphide for from approximately 4 to 5 hours at 25° C., adding approximately from 3175 to 3200 grams of crushed ice and continuing the mixing for ½ to 1 hour, and thereafter permitting the reaction to go to completion.

CLIFFORD J. B. THOR.